United States Patent

[11] 3,620,916

[72] Inventors John W. Hilborn
 Chalk River, Ontario;
 Colin G. Lennox, Pinawa, Manitoba;
 Wilson G. Mathers, Pinawa, Manitoba, all of Canada
[21] Appl. No. 817,955
[22] Filed Apr. 21, 1969
[45] Patented Nov. 16, 1971
[73] Assignee granted to United States Atomic Energy Commission under the provision of 42 U.S.C. 2182

[54] BED NUCLEAR REACTOR
 4 Claims, 2 Drawing Figs.
[52] U.S. Cl...................................... 176/32,
 176/54, 176/52, 176/63
[51] Int. Cl....................................... G21c 1/16,
 G21c 19/02

[50] Field of Search........................................... 176/62, 63, 30–32, 52, 54–56

[56] References Cited
 UNITED STATES PATENTS
 2,990,349 6/1961 Roman ......................... 176/54 X
 3,100,187 8/1963 Fraas............................ 176/32 UX
 3,140,235 7/1964 Hatch et al. .................. 176/32 X Primary Examiner—Carl D. Quarforth
Assistant Examiner—Harvey E. Behrend
Attorney—Roland A. Anderson ABSTRACT: A cavity-type reactor moderated by a heavy water reflector-moderator in an outer shell. The reactor is contained in a core shell which is fitted with a hollow inverted liner spaced from the core shell to form an annular passageway down which incoming feed water is passed. Fuel inside the liner generates steam that passes out through the top of the shells.

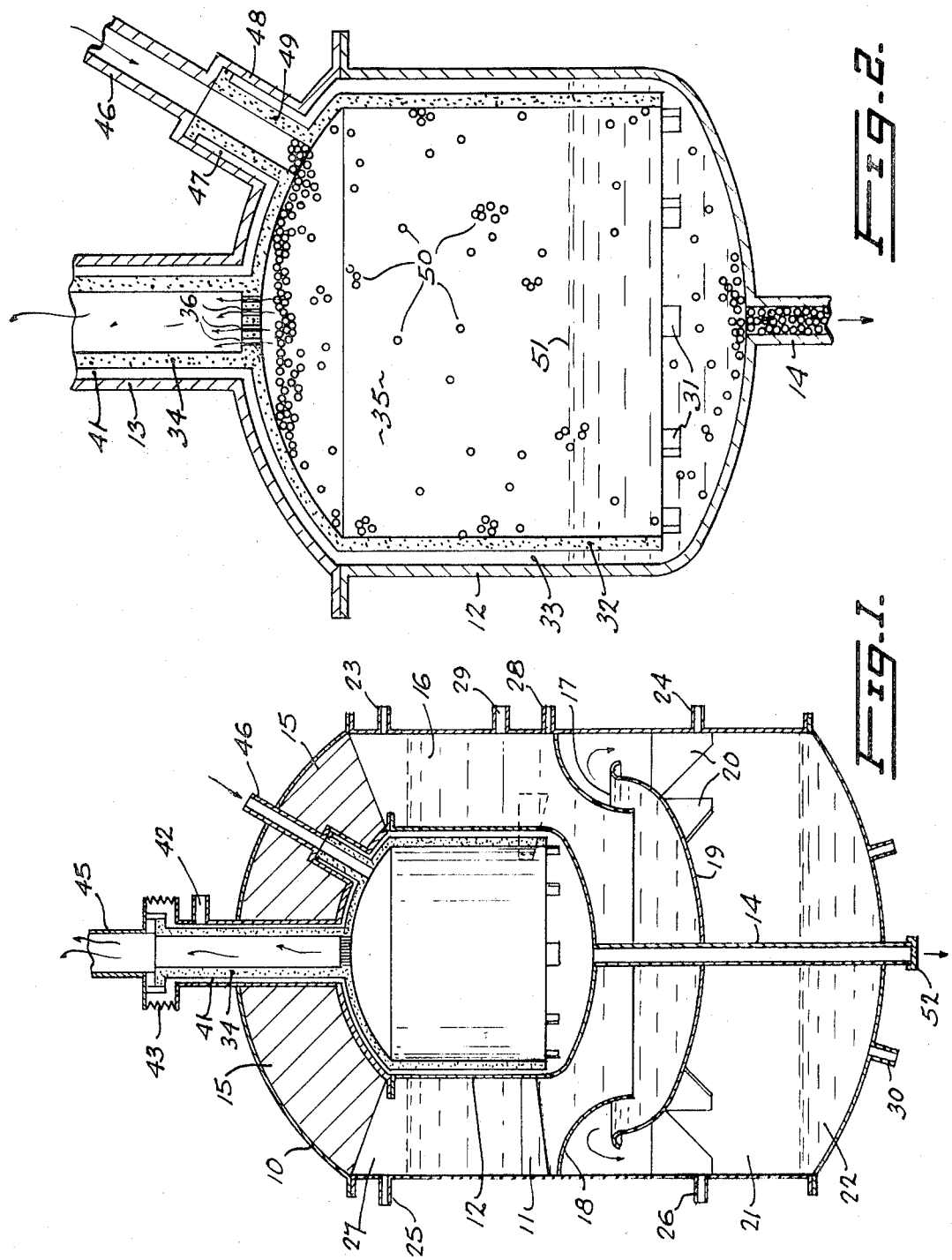

BED NUCLEAR REACTOR

This invention relates to improvements in nuclear reactors of the cavity type, that is to say reactors in which a central cavity or core containing the fissionable fuel is mounted within a surrounding reflector-moderator, the latter usually being of heavy water. Most prior proposals for this type of reactor have incorporated a gaseous $U^{235}F_6$ core inside a heavy water reflector. Various methods of extracting useful energy from the gaseous core have been proposed, but the basic problems of fuel containment and heat transfer still remain largely unsolved.

The object of the present invention is to produce steam from water in the core of a cavity-type reactor, using the fission heat of $U^{235}$ fuel in solid form. The steam will be used for whatever subsequent purpose is desired, for example in a conventional turbine for generating electricity.

One method of carrying the invention into practice is illustrated diagrammatically, and by way of example only, in the accompanying drawings, in which:

FIG. 1 is a central vertical cross section of a reactor according to the invention; and FIG. 2 is a similar cross section of the core of for reactor on an enlarged scale.

An outer metal shell 10 serves by means of brackets 11 to support an inner metal shell 12 defining the core of the reactor. The lower part of the core shell 12 is also connected to the outer shell 10 by means of a tube 14.

The upper area of the space defined between the two shells contains either heavy water or graphite reflectors 15, while the area around the sides of and below the core shell 12 is occupied by a reflector-moderator in the form of a body 16 of heavy water. This body of heavy water is supported by gaseous pressure on an annular free surface 17 thereof, such surface being defined between a downwardly convergent fairing 18 and an upwardly facing bowl-shaped bottom member 19 that is supported from the outer shell 10 on brackets 20. A dump space 21 below the bottom member may contain additional heavy water 22.

Ports 23 and 24 are provided as inlets for helium gas, respectively above and below the main body 16 of moderator; ports 25 and 26 are corresponding outlets. In normal operation, sufficient pressure differential is maintained between the dump space 21 and the space 27 above the moderator, to support the weight of the moderator. This pressure may be adjusted to permit some spillage of heavy water over the edge of the bottom member 19 in order to maintain some circulation of this water. For emergency dumping the helium pressure in the space 21 is suddenly and drastically reduced to allow the moderator to flow rapidly into the dump space.

The upper moderator level which controls reactivity is normally maintained by a combination of this gas pressure control and a moderator inlet 28. In addition, a purification flow inlet 29 and a purification flow outlet 30 will normally be provided. It is to be understood that all the access ports will be provided with appropriate valves, pumps and other auxiliary equipment in the usual way, although no attempt has been made to show these.

As best seen from FIG. 2, the core shell 12 supports inwardly projecting brackets 31 which carry a graphite liner 32 that defines an annular passageway 33 between itself and the shell 12. The liner 32 extends upwardly into a graphite outlet tube 34 that communicates with the fuel space 35 within the liner 32 through apertures 36. The liner 32 terminates near the bottom of the shell 12 to provide free communication between the fuel space 35 within the liner and the annular passageway 33 outside the liner. The outlet from the shell 12 takes the form of the tube 14, already mentioned.

Referring further to FIG. 1, the cylindrical space 41 defined between the tubes 13 and 34 will be seen to communicate with a feed water inlet 42. Expansion bellows 43 are provided between the upper ends of the tubes 0.91 and 34, and a steam outlet pipe 45 is provided forming a continuation of the tube 34.

As seen in both figures, a fuel inlet conduit 46 is provided near the top of the core. The conduit 46 communicates with the fuel space 35 and is partly surrounded by a water jacket space 47 formed between a pair of coaxial, cylindrical extensions 48, 49 of the shell 12 and liner 32, respectively.

The fuel is of spheroidal form and in this embodiment is shaped as spheres 50 that substantially completely fill the fuel space 35 within the liner 32 to constitute a stationary settled fuel bed. Such fuel comprises graphite spheres, solution impregnated with uranium and coated with a ceramic material to protect them against steam oxidation and thus to prevent the release of fissionable material into the coolant. Techniques for impregnating such spheres are described in U.S. Pat. Nos. 2,946,699 and 2,969,294 issued July 26, 1960 and Jan. 24, 1961 to Manuel C. Sanz et al. and James J. Shyne, respectively.

In operation, feed water in the form of light water is caused to flow into the core shell 12 from the inlet 42. It flows down the annular passageway 33 between the shell 12 and the liner 32 and up into the fuel space 35. Typically the water is allowed to reach a level in the fuel space 35 about as shown at 51, i.e. about one-third of the distance up the shell 12. Above the level 51 the interstices between the spheres 50 are filled with steam and superheated steam which is generated from the water by the fuel spheres 50 and which flows out through the apertures 36 and the tubes 34 and 45. Thus the lower spheres 50 are immersed in water and the upper ones in steam. Control of the water level 51 can be exercised both by pressure controls and by the addition of further water through the inlet 42.

The existence of the graphite liner 32 with its comparatively high thermal insulating properties ensures that the material of the shell 12 is not exposed to superheated steam and is indeed cooled by the incoming feed water in the passageway 33. This feature is valuable, since it will be convenient to form the pressure shell 12 from a metal such as Zircaloy for structural reasons, and it is desirable to minimize the exposure of this material to extreme temperatures.

Other advantages flow from the separation of the moderator from the core. The radially outer area of the reactor is a comparatively low-pressure, low-temperature system which is separated by the shell 12, liner 32 and cold feed water in the passageway 33 from the relatively high-pressure, high-temperature core system. This clear separation of the moderator system from the coolant system yields many advantages in design, since it is always desirable to be free of the design limitation that the equipment and materials involved must be able to withstand high temperatures and pressures, as well as large ranges of these parameters.

It should also be noted that the feature of passing the feed water down the passageway 33 has the further advantage that it preheats the cold incoming water to such an extent that it is possible to dispense with the feed water heaters that are normally required.

This arrangement of a cavity reactor with temperature and pressure separation between the fuel and the moderator is especially suited to small reactors, say up to 50 megawatts. The operating pressure of the reactor vessel is low, e.g. 200 p.s.i.a., compared to the pressures usually employed in other water-cooled power reactors. This enables the vessel walls to be kept comparatively thin (e.g. 5 mm. Zircaloy) and the inventory of heavy water for the moderator to be kept relatively low. However, good thermal efficiency can be achieved, because the outlet steam temperature is relatively high, e.g. 500° C.

It is expected that the arrangement shown in the drawings will find its principal utility in small reactors, typically having dimensions of the order of a core shell of about 4 to 5 feet in diameter and of similar height.

The reactor will be fuelled batchwise, although not necessarily with a complete emptying and refilling of the reactor vessel during each fuel change. An appropriate control member, represented diagrammatically by a cap 52, will be moved to allow spent and partly spent fuel spheres to drop down the tube 14 to empty or partly empty the fuel space 35, in accordance with the fuel program in use. Fresh fuel spheres 50 will be added through the tube 46 as required to fill the fuel space 35. If found necessary, more than one such tube 46 can be provided to distribute the fuel evenly across the fuel space 35.

In order to pass fuel into and out of the fuel space 35 whilst the shell 10 is pressurized internally it is necessary to provide sealable compartments in the tube 14 and the conduit 46. This may be done by providing two valves spaced along the tube 14 and two more valves spaced along the conduit 46. To empty spent fuel from the fuel space 35 the inner valve in the tube 14 is opened with the outer valve closed to allow spent fuel to gravitate between the two valves. The inner valve is then closed and the outer one opened to allow the spent fuel to gravitate through the outer valve. To add fresh fuel to the fuel space 35 the outer valve in the conduit 46 is opened with the inner valve closed to allow fuel to gravitate between the two valves. The outer valve is then closed and the inner valve is opened to allow the fresh fuel to gravitate into the fuel space 35.

We claim:
1. A nuclear reactor comprising
   a. a core shell,
   b. an outer shell surrounding said core shell,
   c. means for maintaining a body of heavy water within said outer shell and surrounding said core shell to act as a reflector-moderator,
   d. a hollow liner defining a fuel space, said liner being mounted within said core shell and spaced therefrom to define therebetween an annular passageway extending downwardly to a location at the lower part of said core shell, upper parts of said fuel space being separated from the core shell by the liner and a lower part of said fuel space being in communication with the core shell,
   e. means for introducing feed water into an upper part of said passageway to flow downwardly therethrough into said lower part of the fuel space and upwardly therein,
   f. means for removing steam from an upper part of said fuel space,
   g. means for introducing nuclear fuel in spheroidal form into said fuel space to form a settled bed therein, and
   h. means for removing said fuel from such fuel space and
   i. said core shell serving to maintain said heavy water separate from said feed water.

2. A reactor according to claim 1, wherein said liner is formed of graphite and has high thermal insulating properties.

3. A reactor according to claim 1, wherein the liner takes the form of a cylindrical structure open at its lower end and closed at its top end except for said steam removing means (f).

4. A reactor according to claim 1, wherein said core shell is in the form of a cylinder closed top and bottom, and said means (c) for maintaining heavy water moderator within the outer shell maintains said heavy water around the cylindrical periphery of said core shell and beneath said core shell, further reflector-moderator means being mounted around the top of said core shell.

* * * * *